(12) United States Patent
Nakajima et al.

(10) Patent No.: US 12,453,618 B2
(45) Date of Patent: Oct. 28, 2025

(54) ABNORMALITY DETERMINATION DEVICE AND ABNORMALITY DETERMINATION METHOD FOR DENTAL HANDPIECE

(71) Applicant: NAKANISHI INC., Kanuma (JP)

(72) Inventors: Toyohei Nakajima, Kanuma (JP); Masahiro Higashi, Kanuma (JP)

(73) Assignee: NAKANISHI INC., Kanuma (JP)

( * ) Notice: Subject to any disclaimer, the term of this patent is extended or adjusted under 35 U.S.C. 154(b) by 308 days.

(21) Appl. No.: 18/363,390

(22) Filed: Aug. 1, 2023

(65) Prior Publication Data

US 2024/0050194 A1 Feb. 15, 2024

(30) Foreign Application Priority Data

Aug. 10, 2022 (JP) ................................ 2022-128412

(51) Int. Cl.
*A61C 1/00* (2006.01)
*A61C 1/06* (2006.01)

(52) U.S. Cl.
CPC ............ *A61C 1/0015* (2013.01); *A61C 1/003* (2013.01); *A61C 1/06* (2013.01)

(58) Field of Classification Search
CPC ........... A61C 1/0015; A61C 1/06; A61C 1/08; A61C 1/003
See application file for complete search history.

(56) References Cited

U.S. PATENT DOCUMENTS

2015/0377969 A1 12/2015 Muto et al.

FOREIGN PATENT DOCUMENTS

| JP | 3814894 B2 * | 8/2006 | |
|---|---|---|---|
| JP | 2016-007366 A | 1/2016 | |
| KR | 102112852 B1 * | 5/2020 | ............... A61C 1/06 |
| WO | WO-2012001869 A1 * | 1/2012 | ............ H02P 29/027 |
| WO | WO-2018048857 A1 * | 3/2018 | ........... A61C 1/0038 |

\* cited by examiner

*Primary Examiner* — Christopher E Mahoney
(74) *Attorney, Agent, or Firm* — Rankin, Hill & Clark LLP

(57) ABSTRACT

An abnormality determination device for a dental handpiece, the abnormality determination device including: an electrical current output unit configured to supply, to a drive motor attached to the dental handpiece, a test electrical current in a no-load state, the test electrical current being smaller than a no-load electrical current at a rotational speed of the dental handpiece during a normal treatment in the no-load state; a rotational speed detector configured to detect a rotational speed of the drive motor in a state where the test electrical current is supplied; a processor configured to compare the rotational speed detected by the rotational speed detector with a threshold rotational speed; and an abnormality detector configured to determine abnormality that the dental handpiece is abnormal if the rotational speed detected by the rotational speed detector is smaller than the threshold rotational speed.

8 Claims, 5 Drawing Sheets

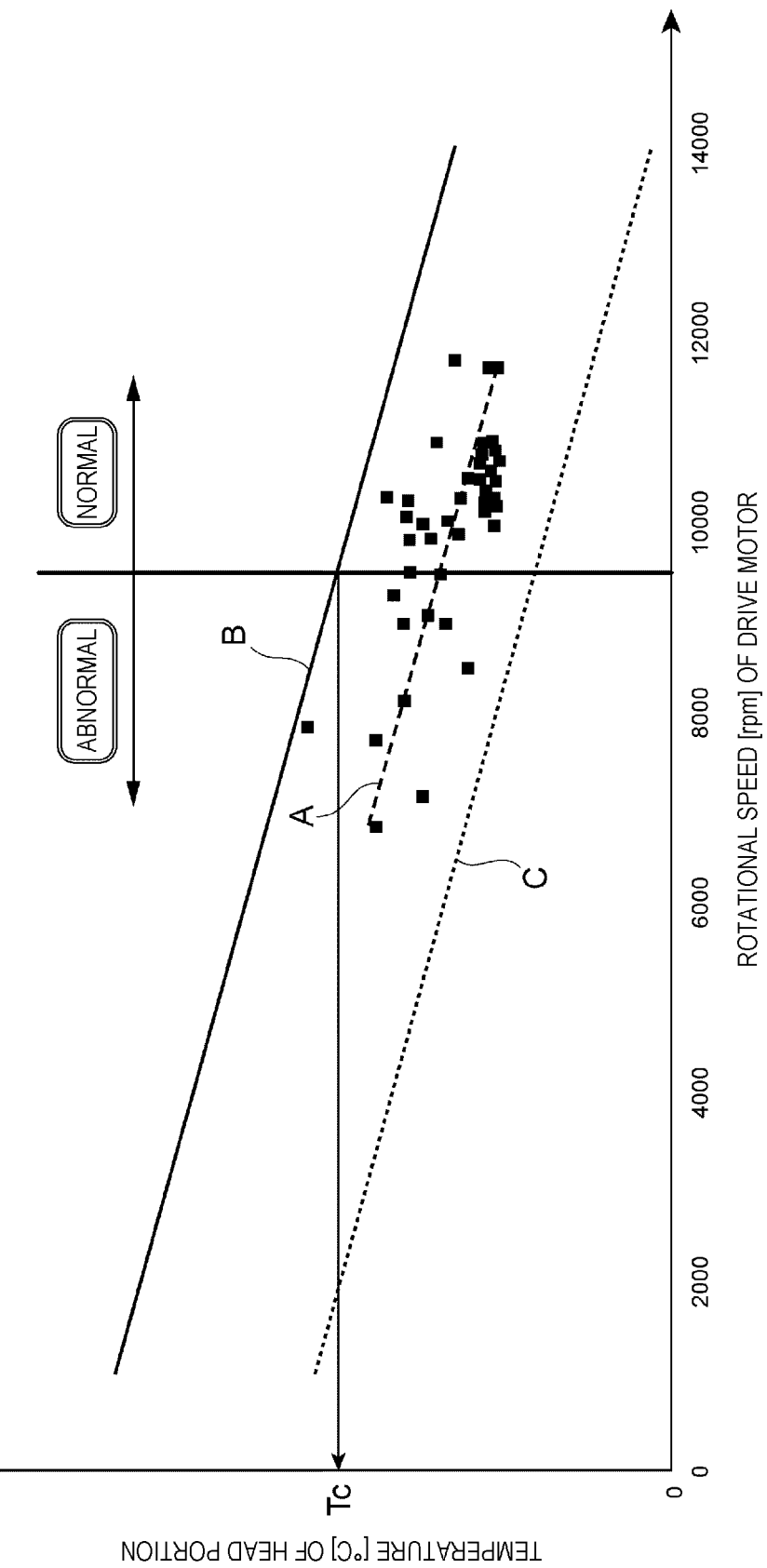

ABNORMALITY DETERMINATION DEVICE AND ABNORMALITY DETERMINATION METHOD FOR DENTAL HANDPIECE

REFERENCE TO RELATED APPLICATIONS

This application claims priority from Japanese Patent Application No. 2022-128412 filed on Aug. 10, 2022. The entire content of the priority application is incorporated herein by reference.

TECHNICAL FIELD

The present disclosure relates to an abnormality determination device and an abnormality determination method for a dental handpiece, and a non-transitory computer-readable storage medium.

BACKGROUND ART

A dental handpiece connected to a motor for cutting teeth and the like transmits rotation of the motor to a tip tool portion (cutting bur) that cuts a tip of the handpiece through a rotation shaft or a gear. The tip tool portion enables high-speed rotation of, for example, 200,000 rpm per minute. If maintenance such as cleaning and lubrication is performed correctly, abnormal heat generation of this tip tool portion will not occur in a normal state, and if the maintenance is not performed correctly, problems such as abnormal heat generation of the tip tool portion may occur due to attachment of a foreign matter or lubricant shortage in a drive part such as a gear or a bearing.

A related-art publication JP2016-007366A (counterpart US publication is US2015-0377969A1) discloses a technique of measuring an electrical current value (no-load electrical current value) of a drive motor when a dental handpiece is operated in a no-load state, and performing an abnormality determination on the dental handpiece. According to this abnormality determination, a maintenance state of the handpiece is estimated from the no-load electrical current value of the handpiece, and a user is informed. The no-load electrical current value is converted to a coefficient, and used for controlling the drive motor so that the abnormal handpiece will not increase a load of the drive motor, thereby preventing abnormal heat generation of the handpiece.

SUMMARY OF INVENTION

In the technique disclosed in the related-art publication JP2016-007366A, an abnormality that causes a relatively large change in an electrical current, such as breakage of a drive shaft inside the handpiece, is determined. However, in recent years, with advancement of handpiece performance, further improvement in an abnormality detection accuracy is desired. Therefore, it is desired to determine an abnormality with sufficient accuracy even if an electrical current change is minute, such as a case where a bearing, gear, or the like in a handpiece is slightly deteriorated.

Therefore, an object of the present disclosure is to provide an abnormality determination device and an abnormality determination method for a dental handpiece, and a non-transitory computer-readable storage medium which are capable of determining an abnormality with higher accuracy than ever before.

According to an aspect of the present disclosure, there is provided an abnormality determination device for a dental handpiece, the abnormality determination device including: an electrical current output unit configured to supply, to a drive motor attached to the dental handpiece, a test electrical current in a no-load state, the test electrical current being smaller than a no-load electrical current at a rotational speed of the dental handpiece during a normal treatment in the no-load state; a rotational speed detector configured to detect a rotational speed of the drive motor in a state where the test electrical current is supplied; a processor configured to compare the rotational speed detected by the rotational speed detector with a threshold rotational speed; and an abnormality detector configured to determine abnormality that the dental handpiece is abnormal if the rotational speed detected by the rotational speed detector is smaller than the threshold rotational speed.

According to the present disclosure, an abnormality in a dental handpiece can be determined with higher accuracy than ever before.

BRIEF DESCRIPTION OF DRAWINGS

FIG. 5 is a graph showing a relationship between a rotational speed of a drive motor and a temperature of a head portion of the dental handpiece regarding samples including a normal product and an abnormal product of the dental handpiece.

DESCRIPTION OF EMBODIMENTS

An abnormality determination device, an abnormality determination method, and a non-transitory computer-readable storage medium for a dental handpiece according to the present disclosure will be described in detail below with reference to the drawings.

Figure 1:
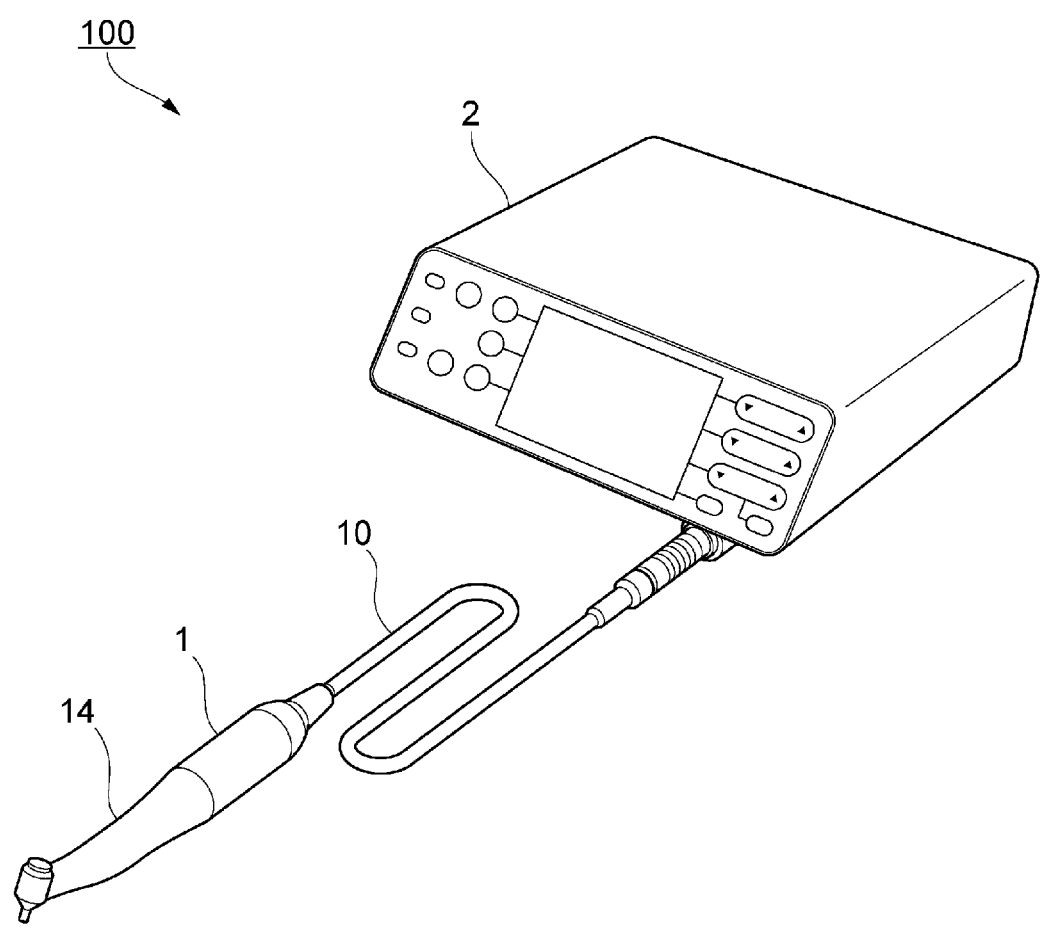
FIG. 1 is an external view of a dental treatment device of an embodiment.

FIG. 1 is an external view of a dental treatment device including a dental handpiece. A dental treatment device 100 includes a drive motor 1, a dental handpiece 14 that can be attached to the drive motor 1, and a controller 2 that is connected to the drive motor 1 with an electric cable 10 and performs an operation control and a check on the drive motor 1. In the dental treatment device 100, the drive motor 1 is driven to rotate under the control of the controller 2, and a tip tool portion (cutting bur) provided at a tip of the dental handpiece 14 is driven to rotate at high speed via a gear or the like, enabling cutting of teeth or the like.

Figure 2:
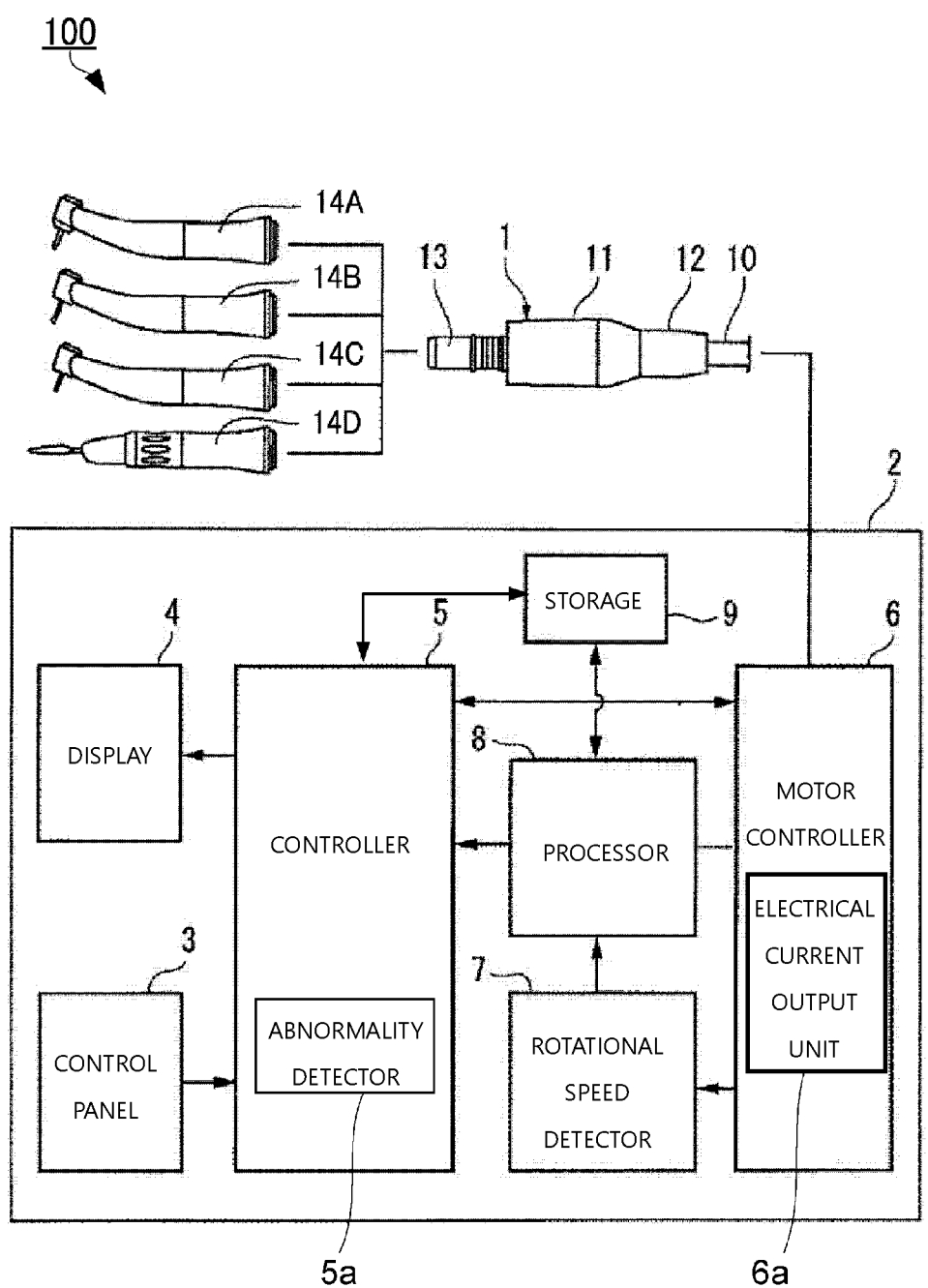
FIG. 2 is a block diagram showing a configuration of the dental treatment device.

FIG. 2 is a block diagram showing a configuration of the dental treatment device 100. The drive motor 1 includes a body portion 11, an electric cable connection portion 12 on a base end side of the body portion 11, and a handpiece connection portion 13 on a tip side of the body portion 11. The electric cable 10 is connected to the electric cable connection portion 12, and electrical connections are made between the drive motor 1 and a power source (not shown) and between the drive motor 1 and the controller 2. To the handpiece connection portion 13, any dental handpiece 14 of contra-angle handpieces 14A, 14B, 14C and a straight handpiece 14D which are specific examples of the dental handpiece 14 is selectively connected.

In the present embodiment, the contra-angle handpiece 14A is a speed-increasing handpiece, and a rotational speed ratio to a rotational speed of the drive motor 1 is five times, for example. The contra-angle handpiece 14B is a constant-speed handpiece. The contra-angle handpiece 14C is a speed-decreasing handpiece, and a rotational speed ratio to the rotational speed of the drive motor 1 is ¼, for example. The straight handpiece 14D is a constant-speed handpiece same as the contra-angle handpiece 14A. In the following description, the handpieces 14A, 14B, 14C, and 14D are collectively described as the dental handpiece 14.

The controller 2 includes a control panel 3, a display 4, a controller 5, a rotational speed detector 7, a processor 8, a storage 9, and a motor controller 6. The control panel 3 is an input unit for allowing a user to input various operation instructions (commands and the like), and may include a button, a liquid crystal touch panel, and the like. The display 4 may include a liquid crystal display or the like for displaying check contents of the drive motor 1 or the like. The controller 2 of the present embodiment also functions as an abnormality determination device for the dental handpiece 14, which determines an abnormality in the dental handpiece 14. This function is implemented mainly by the controller 5, the rotational speed detector 7, the processor 8, the storage 9, and the motor controller 6.

The motor controller 6 is connected to the drive motor 1 and transmits or receives a control signal and an electrical current signal to or from the drive motor 1. As will be described later, the motor controller 6 includes an electrical current output unit 6a that supplies, to the drive motor 1, a test electrical current that is smaller than a no-load electrical current at the rotational speed of the dental handpiece 14 during a normal treatment such as cutting.

The rotational speed detector 7 is connected to the motor controller 6 and detects the rotational speed of the drive motor 1. The processor 8 compares the rotational speed detected by the rotational speed detector 7 with a predetermined threshold rotational speed, and determines magnitude between the detected rotational speed and the threshold rotational speed. Details of the threshold rotational speed will be described later.

The controller 5 may be an arithmetic processing unit (computer) that controls each unit of the controller 2 described above, and controls the controller 2 as a whole. The controller 5 is implemented by, for example, a central processing unit (CPU), a random access memory (RAM) functioning as a main memory of the CPU, and a timer that takes a clock timing (for example, 1 GHz) for arithmetic processing. The controller 5 includes an abnormality detector 5a which determines that the dental handpiece 14 is abnormal if the processor 8 determines that the rotational speed detected by the rotational speed detector 7 is smaller than the threshold rotational speed when the test electrical current is applied.

The storage 9 is implemented by a storage device such as a hard disk drive (HDD), a solid state drive (SSD), or a flash memory. The storage 9 stores various programs and data used by the controller 5 to perform various processes, and various kinds of data generated or acquired by the controller 5 performing various processes. That is, the storage 9 stores an abnormality determination program used for an abnormality determination on the dental handpiece 14, which will be described later, and the threshold rotational speed described above. The controller 5 reads out the abnormality determination program and executes a procedure of the abnormality determination.

Figure 3:
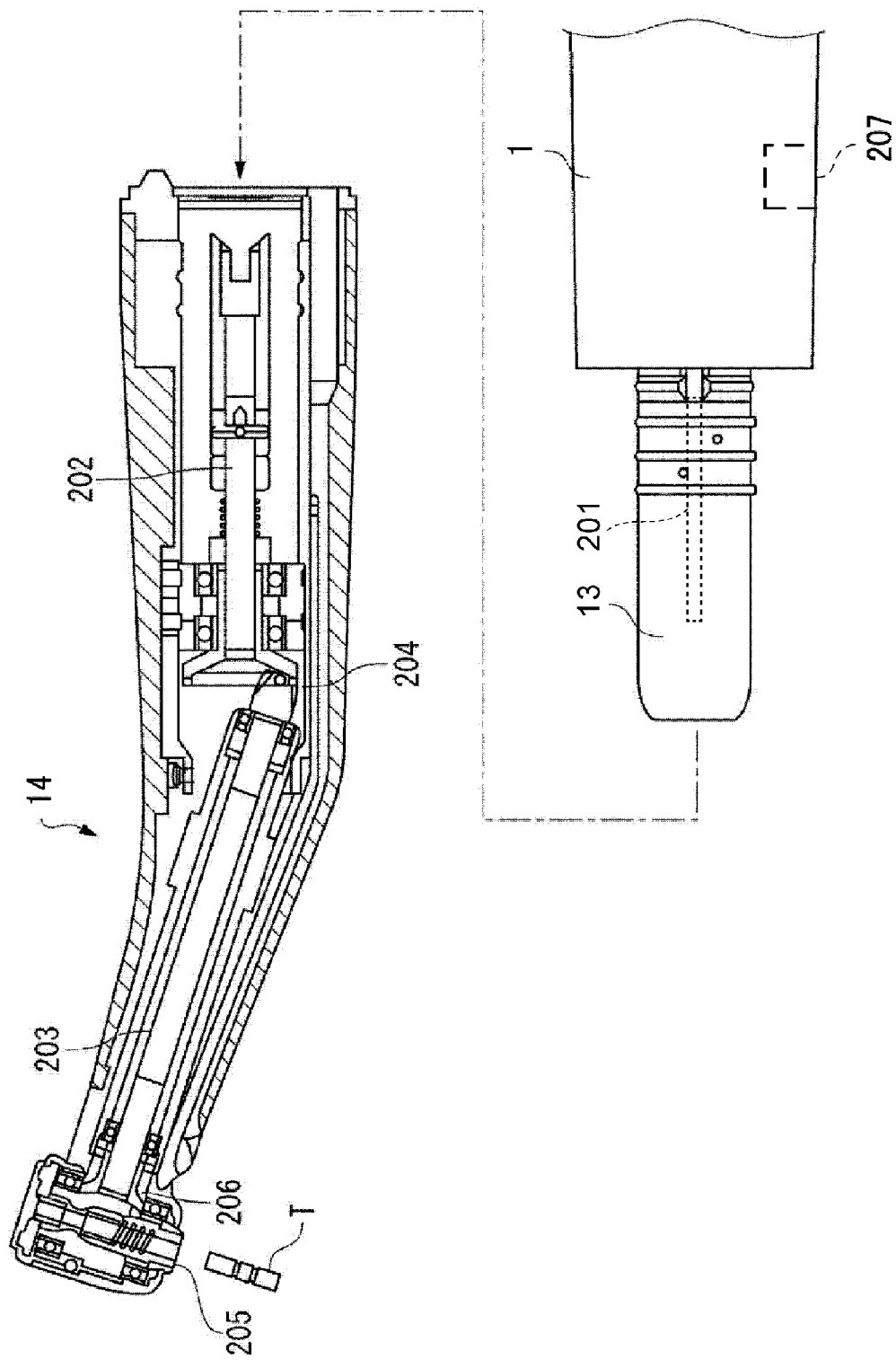
FIG. 3 is a cross-sectional view along an axial direction of a dental handpiece.

FIG. 3 is a cross-sectional view along an axial direction of the dental handpiece 14. The dental handpiece 14 includes a first rotation shaft 202 that rotates while engaging with an output shaft 201 provided in the handpiece connection portion 13 of the drive motor 1, a second rotation shaft 203 inclined with respect to the first rotation shaft 202, a first gear train 204 interposed between the first rotation shaft 202 and the second rotation shaft 203, a tool rotation shaft 205 orthogonal to the second rotation shaft 203, and a second gear train 206 interposed between the second rotation shaft 203 and the tool rotation shaft 205.

The rotational speed of the dental handpiece can be adjusted by a pulse width control (PWM control) on the drive motor 1. In order to increase the rotational speed, for example, if speed ratios in the first gear train 204 and the second gear train 206 are set to values less than 1 and the rotation is performed at a low speed, for example, the speed ratio in the first gear train may be set to a value greater than 1.

A treatment tool T for cutting teeth is detachably attached to a head portion of the dental handpiece 14. The treatment tool T is attached by being axially pushed into the tool rotation shaft 205 and is supported so as to be rotatable at high speed.

A rotational speed sensor 207 that measures the rotational speed of the drive motor 1 is provided inside the drive motor 1. The rotational speed sensor 207 is implemented by, for example, a Hall element. An output signal from the rotational speed sensor 207 is transmitted to the motor controller 6 and the rotational speed detector 7 through the electric cable 10, and the rotational speed detector 7 detects the rotational speed of the drive motor 1. The rotational speed sensor 207 is not limited to the Hall element, and may be a sensor of another type. If the rotational speed is measured by a change in a drive electrical current, a drive voltage, or the like, the rotational speed sensor 207 may not be required.

Troubles of the dental handpiece 14 include those that can be resolved by predetermined maintenance and those that cannot be resolved even by maintenance. The troubles that can be resolved by maintenance include, for example, troubles caused by attachment of dirt, dust, and the like, clogging, lubricant shortage in the various parts described above. Such troubles can also be dealt with at a site (for example, at a dental clinic) where the dental handpiece 14 is used. On the other hand, troubles that cannot be resolved even by maintenance are troubles that require replacement of parts or replacement of the dental handpiece 14 itself, such as breakage of the first rotation shaft 202 and the second rotation shaft 203, and wear of predetermined gears of the first gear train 204, the tool rotation shaft 205, and the second gear train 206. Such troubles are difficult to deal with even at a site where the dental handpiece 14 is used, and needs to be dealt with by equipment manufacturers, repairers, and the like.

In the abnormality determination in the related art, it is common to control a drive electrical current so as to keep the rotational speed of the drive motor 1 constant, monitor a change in the electrical current at that time, and determine whether there is an abnormality in the dental handpiece 14 from a monitoring result. However, such a control is complicated because a feedback control on the rotational speed is performed in order to keep the rotational speed of the drive motor 1 constant. In addition, since the electrical current flowing through the drive motor 1, which originally has a high resistance value, is measured, the electrical current value to be applied inevitably becomes large. Therefore, it is difficult to accurately determine such a minor abnormality if the abnormality is caused by slight wear of a part or the like and a change in an electrical current is small.

On the other hand, in the case of the dental handpiece 14 having an abnormal portion, a torque required for shaft rotation is increased compared to that of a normal product, and the rotational speed of the drive motor 1 under no load is lower than that of the normal product. Therefore, in the present configuration, an abnormality in the target dental handpiece is determined based on whether the rotational speed of the drive motor 1 under no load is greater than a predetermined threshold (threshold rotational speed). The rotational speed in this case is made as a drive electrical current smaller than a motor drive electrical current under a normal cutting load.

Figure 4:
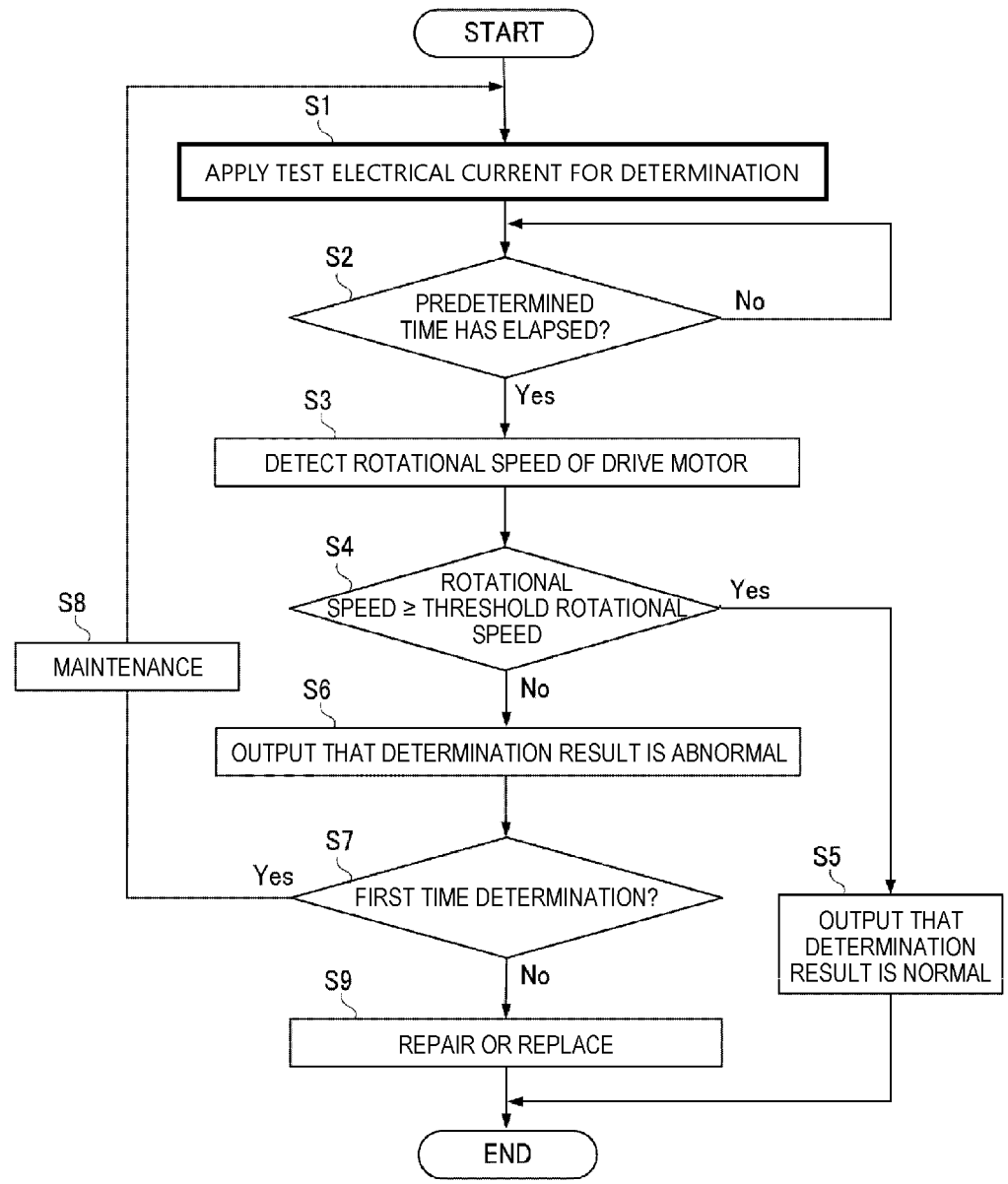
FIG. 4 is a flowchart showing a procedure of an abnormality determination method for a dental handpiece.

A procedure of an abnormality determination method for the dental handpiece 14 performed by the abnormality determination device will be described in detail below. FIG. 4 is a flowchart showing the procedure of the abnormality determination method for the dental handpiece.

First, a user of the dental handpiece 14, such as a dentist or a dental assistant, operates the control panel 3 to make an input to start the abnormality determination on the dental handpiece 14. The controller 5 starts a process of prompting the user of the abnormality determination under a predetermined condition such as a drive time of the dental handpiece 14, outputs the process to the display 4, and the user may receive and execute the process.

The dental handpiece 14 in this case is attached to the drive motor 1 and is in a so-called no-load state where the dental handpiece can be rotated but does not come into contact with an object to be cut. Whether the treatment tool T is attached to the head portion is optional. Then, in accordance with the input of starting the abnormality determination to the control panel 3, the electrical current output unit 6a of the motor controller 6 supplies, to the drive motor 1, the constant test electrical current smaller than the no-load electrical current at the rotational speed of the dental handpiece 14 during the normal treatment, that is, an electrical current in a state where the dental handpiece is attached to the drive motor and is operating at a rotational speed equivalent to that of cutting, but no cutting action is performed (step S1).

The test electrical current is, for example, smaller than the no-load electrical current at the rotational speed during the normal treatment, preferably ⅒ or less (for example, 0.1 A or less). Such a test electrical current can be easily generated without adding special hardware by using a pulse width modulation (PWM) control used for driving the normal drive motor 1.

It can be presumed that the rotation of the drive motor 1 stabilizes after a predetermined time has elapsed since the start of the test electrical current application (step S2; Yes). Therefore, after a predetermined rise time has elapsed since the start of applying the electrical current to the drive motor 1, the rotational speed detector 7 detects the rotational speed of the drive motor 1 under the supply of the test electrical current based on an output signal of the rotational speed sensor 207 which is transmitted to the motor controller 6 (step S3). Accordingly, the rotational speed of the drive motor 1 can be accurately detected, and an abnormality determination accuracy can be improved.

Next, the processor 8 compares the rotational speed detected by the rotational speed detector 7 with the predetermined threshold rotational speed, and determines magnitude between the detected rotational speed and the threshold rotational speed (step S4). The threshold rotational speed may be set to a minimum rotational speed that the drive motor 1 attached with the normal dental handpiece 14 is required to achieve under no load. The threshold rotational speed can be experimentally and empirically derived for each type of the dental handpieces 14 attached to the specific drive motor 1. The threshold rotational speed is stored in the storage 9. A specific example of the threshold rotational speed will be described later.

If the rotational speed detected by the rotational speed detector 7 is equal to or greater than the threshold rotational speed under the above test electrical current application (step S4; Yes), the minimum rotational speed that the drive motor 1 is required to achieve is satisfied, and the attached dental handpiece 14 is presumed to be normal. Therefore, the abnormality detector 5a of the controller 5 determines that the dental handpiece 14 is normal, and in response to receiving this determination, the display 4 outputs that the determination result is normal (step S5).

On the other hand, if the rotational speed detected by the rotational speed detector 7 is smaller than the threshold rotational speed under the test electrical current application (step S4; No), the minimum rotational speed that the drive motor 1 is required to achieve is not satisfied, and the attached dental handpiece 14 is presumed to be abnormal. Therefore, the controller 5 functioning as the abnormality detector determines that the dental handpiece 14 is abnormal, and in response to receiving this determination, the display 4 outputs that the determination result is abnormal (step S6).

The procedures of steps S1 to S6 described above are basic procedures for the abnormality determination. The user can determine the abnormality in the dental handpiece 14 with high accuracy by these procedures. That is, the test electrical current is a value smaller than the no-load electrical current at the rotational speed during the normal treatment, and thus, it is possible to easily detect an abnormality in the rotational speed (decrease in the rotational speed) caused by a slight abnormality, and to improve the abnormality determination accuracy.

The controller 5 reads out the abnormality determination program from the storage 9, and the motor controller 6 including the electrical current output unit 6a, the rotational speed detector 7, the processor 8, and the controller 5 including the abnormality detector 5a are operated by execution on the program, and thus, these determination procedures are implemented. That is, the user can easily perform the abnormality determination according to various situations simply by rewriting the abnormality determination program stored in the storage 9 without modifying the hardware of the existing devices.

After the abnormality determination is output in step S6, in the present embodiment, first, it is determined whether this abnormality determination is the first time (step S7). This determination may be made after the user stores the progress, or may be made after the abnormality determination device stores the progress and notifies the user of the number of times the abnormality determination is performed with the display 4 or the like.

If the present determination is the first time determination (step S7; Yes), the user performs maintenance on the dental handpiece 14 that is determined to be abnormal (step S8). The maintenance includes a series of adjustment processes such as sterilization, cleaning, and lubrication. A device such as an autoclave may be used for the maintenance.

After the maintenance, the abnormality determination device executes the procedures of steps S1 to S4 again. If the dental handpiece 14 is in a normal state due to the maintenance and the rotational speed detected by the rotational speed detector 7 is equal to or greater than the threshold rotational speed (Step S4; Yes), the controller 5 determines that the dental handpiece 14 is normal, and in response to receiving this determination, the display 4 outputs that the determination result is normal (step S5).

On the other hand, if the rotational speed detected by the rotational speed detector 7 is smaller than the threshold rotational speed (step S4; No) even after the maintenance, the dental handpiece 14 is presumed to be abnormal. Therefore, the abnormality detector 5a of the controller 5 determines that the dental handpiece 14 is abnormal, and in response to receiving this determination, the display 4 outputs that the determination result is normal (step S6).

The determination after the above maintenance is the second time determination (step S7; No). If the dental handpiece 14 remains in the abnormal state even after the maintenance, it is presumed that the dental handpiece 14 has a problem that cannot be resolved (missing parts, breakage of parts, and the like) even by the maintenance and requires repair or replacement. In this case, the user determines that the dental handpiece 14 needs to be repaired or replaced (step S9). The display 4 may output a display prompting the user of repairing, replacing, or the like.

In the above procedure, if the dental handpiece 14 is determined to be abnormal in the first determination, after the maintenance of the dental handpiece 14 (step S8), the abnormality determination device further determines the abnormality in the dental handpiece 14 (steps S1 to S4). Accordingly, the user can determine that the dental handpiece 14, which is restored to the normal state by the maintenance, can continue to be used as it is, and can determine that a process such as repair or replacement is necessary for the dental handpiece 14 that is not recovered to the normal state and remains abnormal.

Accordingly, it is possible to sort out the abnormal dental handpiece 14 according to the state after the maintenance and further according to a degree of the abnormality. Therefore, it is possible to selectively extract only the dental handpiece 14 that cannot be restored by the maintenance, and repair or replace this dental handpiece 14. Therefore, unnecessary repairs and replacements can be prevented, and the dental handpiece 14 can be operated appropriately and smoothly in the site. The rotational speed to be compared by the processor 8 described above may be an average value over a predetermined time in consideration of instantaneous fluctuations. Accordingly, the abnormality determination accuracy can be improved.

FIG. 5 is a graph showing a relationship between the rotational speed of the drive motor 1 and a temperature of the head portion of the dental handpiece 14 regarding samples including a normal product and an abnormal product of the dental handpiece 14. This graph is used for determining the above-described threshold rotational speed (step S4 in FIG. 4).

Here, regarding a specific type of the dental handpiece 14, a plurality of samples including a mixture of a normal product having no abnormality and an abnormal product (defective product) having an abnormality are attached to the drive motor 1, and a constant value (0.1 A) of the test electrical current is applied in the no-load state. FIG. 5 shows the relationship (rotational speed-temperature characteristics) between the rotational speed (rpm) of the drive motor and the temperature (° C.) of the head portion when the test electrical current is applied. The test electrical current of 0.1 A is smaller than the no-load electrical current at the rotational speed during the normal treatment. Therefore, the rotational speed under the test electrical current is within a range of 6,000 rpm to 12,000 rpm, which is significantly lower than the rotational speed during the normal treatment (up to about 200,000 rpm). Assuming normal use, the temperature is measured using a thermocouple disposed in the head portion while water is being supplied (cooled) to the head portion.

In FIG. 5, each plotted point corresponds to each sample, and a predetermined regression line A is obtained from a distribution of the plotted points. The regression line A shows a tendency that the temperature of the head portion increases as the rotational speed decreases.

In the graph, a "+3e" value of the temperature at each rotational speed is indicated by a straight line B, and a "−3e" value is indicated by a straight line C, where "e" represents a standard error of a temperature variation. Excessive temperature rise of the head portion should be avoided, and thus, a sample that exhibits a rotational speed that keeps the temperature below a proper temperature on the straight line B is determined to be a normal sample.

If the proper temperature is set to Tc (° C.), 9,500 rpm is set as the threshold rotational speed. This threshold rotational speed is used to perform the abnormality determination. That is, it is determined that when the test electrical current of 0.1 A is applied, the dental handpiece 14 that rotates at the rotational speed of 9,500 rpm or more has no abnormality, and the dental handpiece 14 that rotates at a rotational speed of less than 9,500 rpm is determined to be abnormal. Handpieces have different components such as bearings and gears depending on the type, and accordingly the proper temperature Tc, which is a boundary between the normal product and the abnormal product, also differs, and thus, it is necessary to set the proper temperature Tc for each type of the handpieces.

Accordingly, the threshold rotational speed is derived from the relationship between the rotational speed of the drive motor 1 and the temperature of the head portion of the dental handpiece 14 for the plurality of samples of the specific type of the dental handpiece 14. Accordingly, the threshold rotational speed can be appropriately set according to the type of the dental handpiece 14.

23,000 rpm, which is set as the threshold rotational speed, is about 1/10 of the rotational speed during a load operation, and in the present embodiment, since an abnormality is determined at a low rotational speed, a weak torque change due to small friction, wear, or the like can also be reliably detected.

Appropriate values are selected for the threshold rotational speed and the test electrical current depending on the type of the dental handpiece 14 to be determined and further depending on the type of the drive motor 1. Such values can be set through the process illustrated with reference to FIG. 5.

The present disclosure is not limited to the above embodiments, and combinations of the respective configurations of the embodiments, and changes and applications made by those skilled in the art based on the description of the specification and the well-known technology are also intended by the present disclosure and are included within the scope to be protected.

As described above, the following contents are disclosed in the present description.

(1) An abnormality determination device for a dental handpiece, the abnormality determination device including: an electrical current output unit configured to supply, to a drive motor attached to the dental handpiece, a test electrical current in a no-load state, the test electrical current being smaller than a no-load electrical current at a rotational speed of the dental handpiece during a normal treatment in the no-load state; a rotational speed detector configured to detect a rotational speed of the drive motor in a state where the test electrical current is supplied; a processor configured to compare the rotational speed detected by the rotational speed detector with a threshold rotational speed; and an abnormality detector configured to determine abnormality that the dental handpiece is abnormal if the rotational speed detected by the rotational speed detector is smaller than the threshold rotational speed.

According to this abnormality determination device for a dental handpiece, since it is determined that the dental handpiece is abnormal if the detected rotational speed is smaller than the threshold rotational speed when the test electrical current is applied, an abnormality can be determined with high accuracy.

(2) The abnormality determination device for a dental handpiece according to (1) further including: a storage that stores the threshold rotational speed, wherein the processor refers to the threshold rotational speed stored in the storage in comparing the rotational speed detected by the rotational speed detector.

(3) The abnormality determination device for a dental handpiece according to (2), wherein the threshold rotational speed is derived from a relationship between the rotational speed of the drive motor and a temperature of a head portion of the dental handpiece for a plurality of samples of a specific type of the dental handpiece.

According to this abnormality determination device for a dental handpiece, an appropriate threshold rotational speed can be set according to the type of the dental handpiece.

(4) The abnormality determination device for a dental handpiece according to (1), wherein the abnormality detector is configured to determine the abnormality again after maintenance is performed on the dental handpiece due to be determined that the dental handpiece is abnormal.

According to this abnormality determination device for a dental handpiece, depending on a state of the dental handpiece after the maintenance, it is possible to sort out whether the abnormality is recovered.

(5) The abnormality determination device for a dental handpiece according to (1), wherein the processor compares an average value of the rotational speed with the threshold rotational speed.

According to this abnormality determination device for a dental handpiece, it is less likely to be affected by instantaneous fluctuations in the rotational speed, and an abnormality determination accuracy can be improved.

(6) The abnormality determination device for a dental handpiece according to (1), wherein the rotational speed detector detects the rotational speed after a predetermined time period has elapsed since a start of supplying the test electrical current to the drive motor.

According to this abnormality determination device for a dental handpiece, an accurate rotational speed can be detected after the rotation of the drive motor is stabilized, and the abnormality determination accuracy can be improved.

(7) An abnormality determination method for a dental handpiece, the method including: supplying, to a drive motor attached to the dental handpiece, a test electrical current in a no-load state, the test electrical current being smaller than a no-load electrical current at a rotational speed of the dental handpiece during a normal treatment in the no-load state; detecting a rotational speed of the drive motor in a state where the test electrical current is supplied; comparing the rotational speed with a threshold rotational speed; and determining abnormality that the dental handpiece is abnormal if the rotational speed is smaller than the threshold rotational speed.

According to this abnormality determination method for a dental handpiece, since it is determined that the dental handpiece is abnormal if the detected rotational speed is smaller than the threshold rotational speed when the test electrical current is applied, an abnormality can be determined with high accuracy.

(8) A non-transitory computer-readable storage medium storing a program executable by a computer of an abnormality determination device for a dental handpiece, the program, when executed by the computer, causing the abnormality determination device to perform: supplying, to a drive motor attached to the dental handpiece, a test electrical current in a no-load state, the test electrical current being smaller than a no-load electrical current at a rotational speed of the dental handpiece during a normal treatment in the no-load state; detecting a rotational speed of the drive motor in a state where the test electrical current is supplied; comparing the rotational speed with a threshold rotational speed; and determining abnormality that the dental handpiece is abnormal if the rotational speed is smaller than the threshold rotational speed.

According to this non-transitory computer-readable storage medium, since it is determined that the dental handpiece is abnormal if the detected rotational speed is smaller than the threshold rotational speed when the test electrical current is applied, an abnormality can be determined with high accuracy. That is, the abnormality determination can be easily performed simply by rewriting an abnormality determination program without modifying hardware of an existing device.

Although the present disclosure has been specifically described based on the embodiments, the present disclosure is not limited to the above embodiments, and various modifications are possible.

What is claimed is:

1. An abnormality determination device for a dental handpiece, the abnormality determination device comprising:
    an electrical current output unit configured to supply, to a drive motor attached to the dental handpiece, a test electrical current in a no-load state, the test electrical current being smaller than a no-load electrical current at a rotational speed of the dental handpiece during a normal treatment in the no-load state;
    a rotational speed detector configured to detect a rotational speed of the drive motor in a state where the test electrical current is supplied;
    a processor configured to compare the rotational speed detected by the rotational speed detector with a threshold rotational speed; and
    an abnormality detector configured to determine abnormality that the dental handpiece is abnormal if the rotational speed detected by the rotational speed detector is smaller than the threshold rotational speed.

2. The abnormality determination device for a dental handpiece according to claim 1 further comprising:
    a storage that stores the threshold rotational speed,
    wherein the processor refers to the threshold rotational speed stored in the storage in comparing the rotational speed detected by the rotational speed detector.

3. The abnormality determination device for a dental handpiece according to claim 2,
    wherein the threshold rotational speed is derived from a relationship between the rotational speed of the drive motor and a temperature of a head portion of the dental handpiece for a plurality of samples of a specific type of the dental handpiece.

4. The abnormality determination device for a dental handpiece according to claim 1,
wherein the abnormality detector is configured to determine the abnormality again after maintenance is performed on the dental handpiece due to be determined that the dental handpiece is abnormal.

5. The abnormality determination device for a dental handpiece according to claim 1,
wherein the processor compares an average value of the rotational speed with the threshold rotational speed.

6. The abnormality determination device for a dental handpiece according to claim 1,
wherein the rotational speed detector detects the rotational speed after a predetermined time period has elapsed since a start of supplying the test electrical current to the drive motor.

7. An abnormality determination method for a dental handpiece, the method comprising:
supplying, to a drive motor attached to the dental handpiece, a test electrical current in a no-load state, the test electrical current being smaller than a no-load electrical current at a rotational speed of the dental handpiece during a normal treatment in the no-load state;
detecting a rotational speed of the drive motor in a state where the test electrical current is supplied;
comparing the rotational speed with a threshold rotational speed; and
determining abnormality that the dental handpiece is abnormal if the rotational speed is smaller than the threshold rotational speed.

8. A non-transitory computer-readable storage medium storing a program executable by a computer of an abnormality determination device for a dental handpiece, the program, when executed by the computer, causing the abnormality determination device to perform:
supplying, to a drive motor attached to the dental handpiece, a test electrical current in a no-load state, the test electrical current being smaller than a no-load electrical current at a rotational speed of the dental handpiece during a normal treatment in the no-load state;
detecting a rotational speed of the drive motor in a state where the test electrical current is supplied;
comparing the rotational speed with a threshold rotational speed; and
determining abnormality that the dental handpiece is abnormal if the rotational speed is smaller than the threshold rotational speed.

* * * * *